(12) United States Patent
Takeuchi et al.

(10) Patent No.: US 6,968,592 B2
(45) Date of Patent: Nov. 29, 2005

(54) SELF-RUNNING VACUUM CLEANER

(75) Inventors: Ikuo Takeuchi, Chiyoda (JP); Yutaka Arai, Chiyoda (JP); Yasuhiro Nemoto, Ogawa (JP); Atsushi Koseki, Toride (JP); Taiji Tajima, Tsukuba (JP)

(73) Assignee: Hitachi, Ltd., Tokyo (JP)

( * ) Notice: Subject to any disclaimer, the term of this patent is extended or adjusted under 35 U.S.C. 154(b) by 275 days.

(21) Appl. No.: 10/102,909

(22) Filed: Mar. 22, 2002

(65) Prior Publication Data
US 2002/0138936 A1    Oct. 3, 2002

(30) Foreign Application Priority Data
Mar. 27, 2001  (JP)  ............................. 2001-089023

(51) Int. Cl.[7] .......................... A47L 5/00; G05B 19/18; G01C 22/00
(52) U.S. Cl. .......................... 15/319; 15/339; 700/245; 700/247; 700/253; 700/257; 340/825.72; 701/25
(58) Field of Search .......... 15/319, 339; 700/245–247, 700/253, 257, 258; 701/23, 24–26; 318/568.1; 901/1; 340/825.69, 825.72; 180/167

(56) References Cited

U.S. PATENT DOCUMENTS 5,109,566 A * 5/1992 Kobayashi et al. ........... 15/319
5,341,540 A * 8/1994 Soupert et al. ............... 15/319
5,568,589 A * 10/1996 Hwang .......................... 706/52
5,634,237 A * 6/1997 Paranjpe ....................... 15/319
6,459,955 B1 * 10/2002 Bartsch et al. .............. 700/245

FOREIGN PATENT DOCUMENTS

JP    63-234925    9/1988
JP    5-253128    10/1993

* cited by examiner

Primary Examiner—Robert J. Warden, Sr.
Assistant Examiner—Laura C Cole
(74) Attorney, Agent, or Firm—Antonelli, Terry, Stout and Kraus, LLP.

(57) ABSTRACT

A self-running vacuum cleaner comprises a homing mode of following a back of a user with receiving a signal from a light emitting means or a transmitting means of a position indicator means held by the user, an instruction operation mode, in which the user instructs a cleaning area to the self-running vacuum cleaner, and an execution mode for cleaning up the cleaning area instructed. When the self-running vacuum cleaner operates under the homing mode or the instruction mode, a signal from the light-emitting means or the transmitting means is received by a receiver means attached on a periphery portion of a measuring means, which is provided in an upper portion of the vacuum cleaner. Comparing the signals from the two (2) receiver means in strength thereof determines the distance and the direction from the position indicated by the light-emitting means or the transmitting means up to the vacuum cleaner.

25 Claims, 5 Drawing Sheets

SELF-RUNNING VACUUM CLEANER

BACKGROUND OF THE INVENTION

The present invention relates to a self-running vacuum cleaner for cleaning by running by itself and a control method thereof, in particular, to the self-running vacuum cleaner, being suitable for moving upon an instruction of a user.

Cleaning is one of the burdensome housework for a housekeeper. In particular, for a person handicapped due to a sickness and/or an accident, and/or for an aged who's muscles are lowered or weaken in functions, it is also very burdensome work to operate the vacuum cleaner. While, with a self-running vacuum cleaner, being used in offices and/or public facilities, it must be given an instruction in advance, by inputting a map, for example, therefore it is difficult to give the instruction for cleaning up places, accurately, where the surrounding thereof is always changing day by day, such as, in a home, for example.

Then, according to an electric vacuum cleaner described in Japanese Patent Laying-Open No. 5-253128 (1993), for example, tension is detected when a user tries to draw around the hose thereof, so as to drive or move the main body of vacuum cleaner responding to the force applied onto the hose, thereby lightening a load of the user. Also, in a self-running electric vacuum cleaner, being described in Japanese Patent Laying-Open No. 63-23492 (1988), for example, providing a transmitter held by the user and a receiver portion for detecting an order of receiving, the vacuum cleaner is moved into a direction in which the user swings the transmitter. With this, the user can make the vacuum cleaner move into the direction at her/his desire.

Cleaning of wide spaces, such as, the offices and the public facilities, etc., puts a large load upon a worker(s), the self-running vacuum cleaner comes to be applied to, which runs by itself from place to place which is determined in advance upon the basis of a map of the workplace. Such the self-running vacuum cleaner mounts a sensor thereon, for detecting obstructions or the like, thereby cleaning up a region or area which is preset while avoiding obstructions when the cleaner detects the obstruction not shown or indicated on the map.

However, according to each of the conventional arts mentioned above, the user must give an instruction of driving direction for the vacuum cleaner, by drawing up the hose or swinging the transmitter portion. However, with such the method, when moving the vacuum cleaner from a storage place out to a place to be cleaned, passing through a narrow stairways, the user must operate it while paying attention, so that the vacuum cleaner will not hits on walls and furniture, in particular, when she/he tries to clean up a room where the furniture stands. For doing such the operation well and freely, while moving around and arranging things neatly in an indoor, practice is needed for the user. For this reason, the vacuum cleaner, according to the conventional arts, brings about a problem that, for an aged person and/or a user who is not well practiced, it is difficult to move or guide the vacuum cleaner to the places at her/his wish, easily.

BRIEF SUMMARY OF THE INVENTION

An object, according to the present invention, is to provide a self-running vacuum cleaner, with which the load imposed upon the user can be reduced.

According to the present invention, for accomplishing the object mentioned above, there is provided a self-running vacuum cleaner, being able to move by itself, with detecting an instruction signal generated by an indicating means, comprises: a cleaning portion for cleaning up a floor surface; a moving means for moving said cleaning portion; a driving means for driving said moving means; and a position detecting means for inputting an indication signal generated by said indicating means and for detecting a position of said indicating means, wherein said vacuum cleaner moves to at least one of plural numbers of positions which are indicated by said indicating means.

Also, according to the present invention, for accomplishing the object mentioned above, there is further provided self-running vacuum cleaner, being able to move by itself, with detecting an instruction signal generated by an indicating means, comprises: a cleaning portion for cleaning up a floor surface; a moving means for moving said cleaning portion; a driving means for driving said moving means; and a position detecting means for inputting an indication signal generated by said indicating means and for detecting a position, wherein said vacuum cleaner defines a cleaning area on the floor surface upon basis of plural numbers of positions indicated by said indicating means, thereby moving to said area and making cleaning.

According to the present invention, in the self-running vacuum cleaner, as described in the above, preferably, said indicating means comprises a light emitting means, and said indication signal is a light signal. The self-running vacuum cleaner may be so set or determined, that it moves to an area defined by two (2) or more positions inputted, thereby to make cleaning within the area, or that a pattern is selectable by the user in moving of the vacuum cleaner within the area.

Further, according to the present invention, there is provided a self-running vacuum cleaner, being able to move by itself upon basis of a signal received, comprises: a cleaning portion for cleaning up a floor surface; a moving means for moving said cleaning portion; a driving means for driving said moving means; and a position detecting means for detecting information of positions which is inputted to said self-running vacuum cleaner by a user in advance, wherein said self-running vacuum cleaner moves to cleaning positions which are determined in advance upon basis of plural numbers of position information detected by said position detecting means, thereby making cleaning.

Moreover, according to the present invention, there is further provided a self-running vacuum cleaner, being able to move by itself, with detecting an instruction signal generated by an indicating means, comprises: a cleaning portion for cleaning up a floor surface; a moving means for moving said cleaning portion; a driving means for driving said moving means; and a position detecting means for detecting a position by inputting an indication signal generated by said indicating means, wherein said self-running vacuum cleaner is selectable into one of modes, including: a mode of following the indication signal generated from said indicating means; a mode of instructing plural numbers of positions from said indicating means; and a mode of moving to any one of said plural numbers of positions, thereby making cleaning.

BRIEF DESCRIPTION OF THE SEVERAL VIEWS OF THE DRAWING

Those and other features, objects and advantages of the present invention will become more apparent from the following description when taken in conjunction with the accompanying drawings wherein.

DETAILED DESCRIPTION OF THE INVENTION

Hereinafter, embodiments according to the present invention will be fully explained, by referring to the attached drawings.

Figure 1:
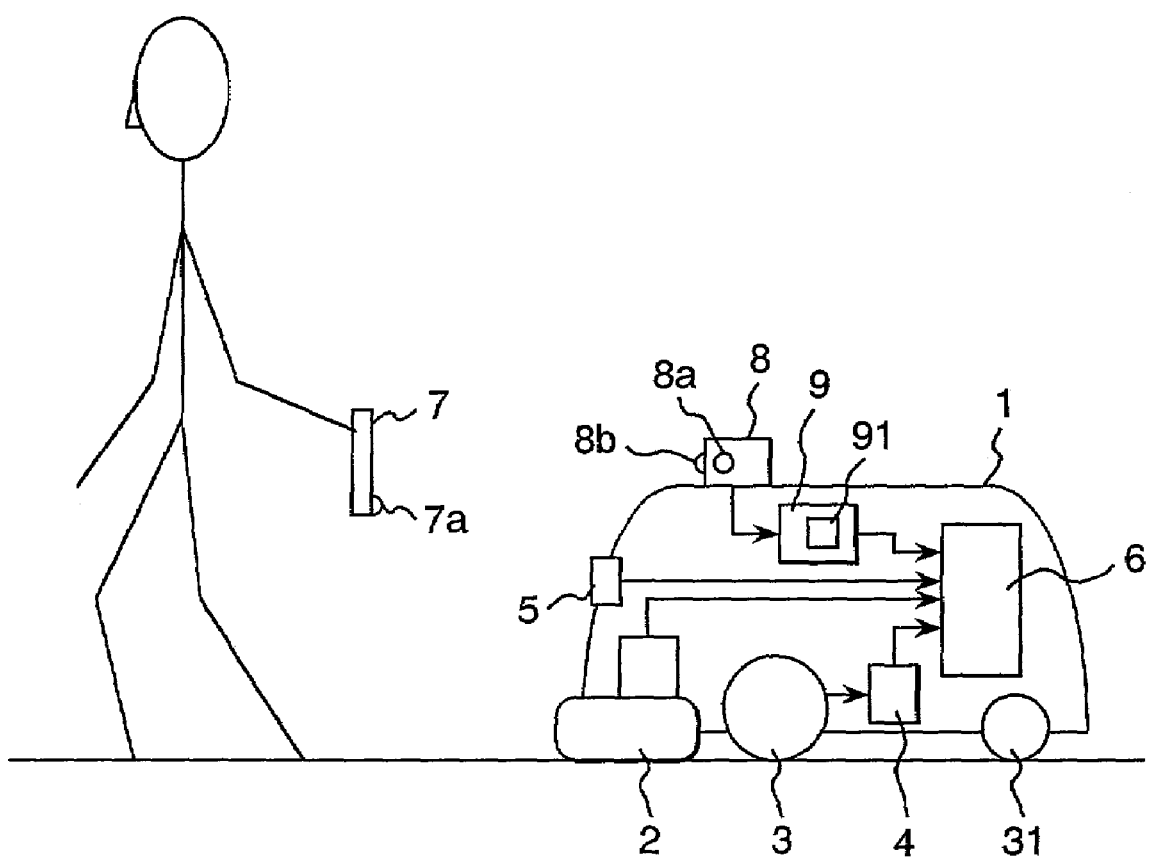
FIG. 1 is a vertical cross-sectional view of an embodiment, a self-running vacuum cleaner, according the present invention.
Figure 2:
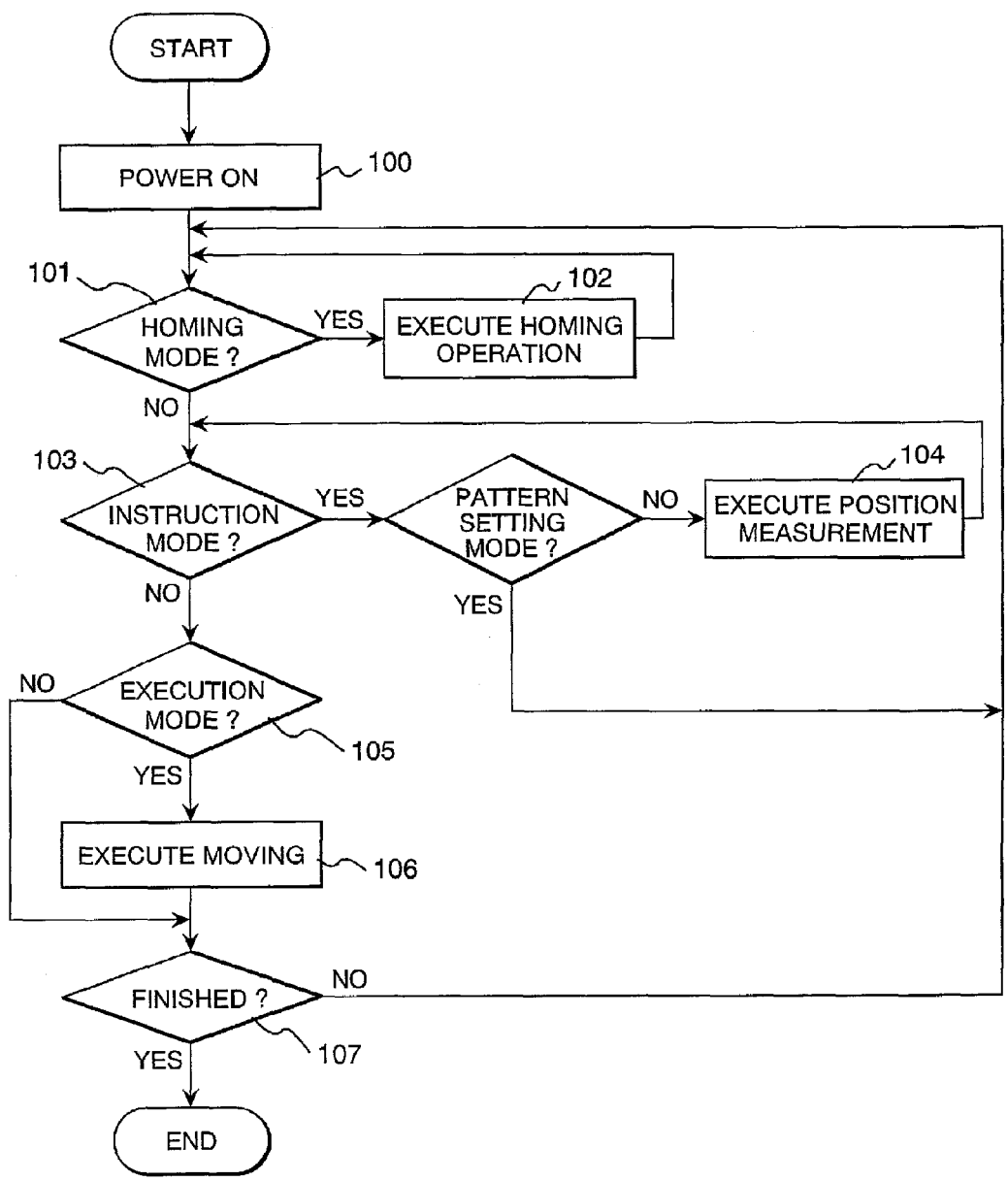
FIG. 2 is a flowchart for explaining the operation of the self-running vacuum cleaner shown in FIG. 1.
Figure 3:
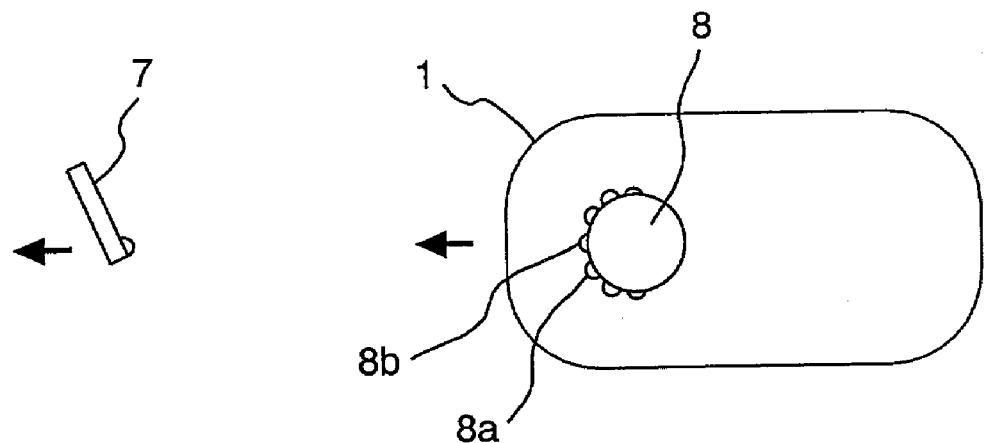
FIG. 3 is a view for explaining the operation of the self-running vacuum cleaner shown in FIG. 1.
Figure 4:
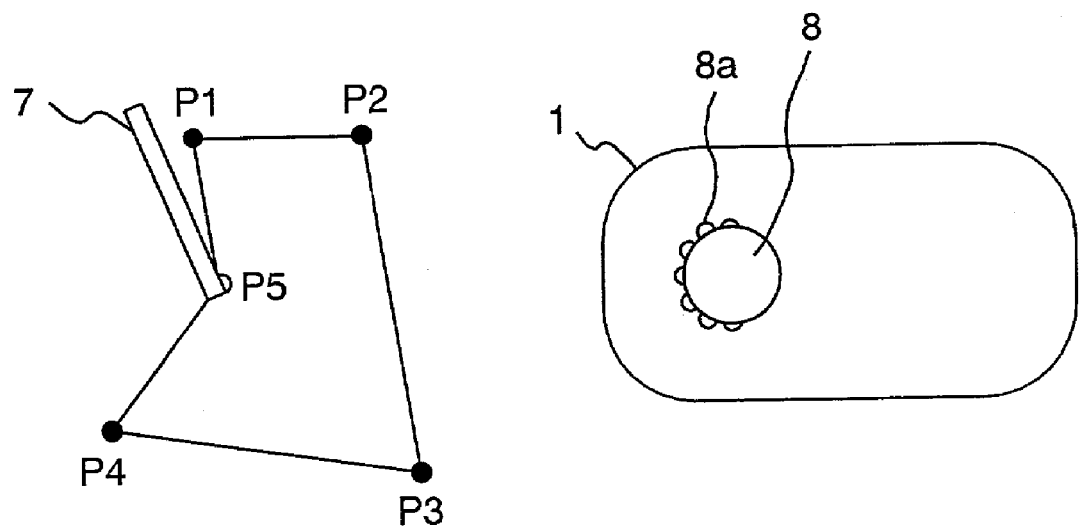
FIG. 4 is a view for explaining an instruction of position to the self-running vacuum cleaner shown in FIG. 1.
Figure 5:
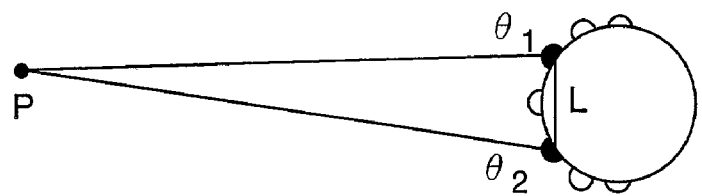
FIG. 5 is a view for explaining a method for measuring the position of the self-running vacuum cleaner shown in FIG. 1.
Figure 6:
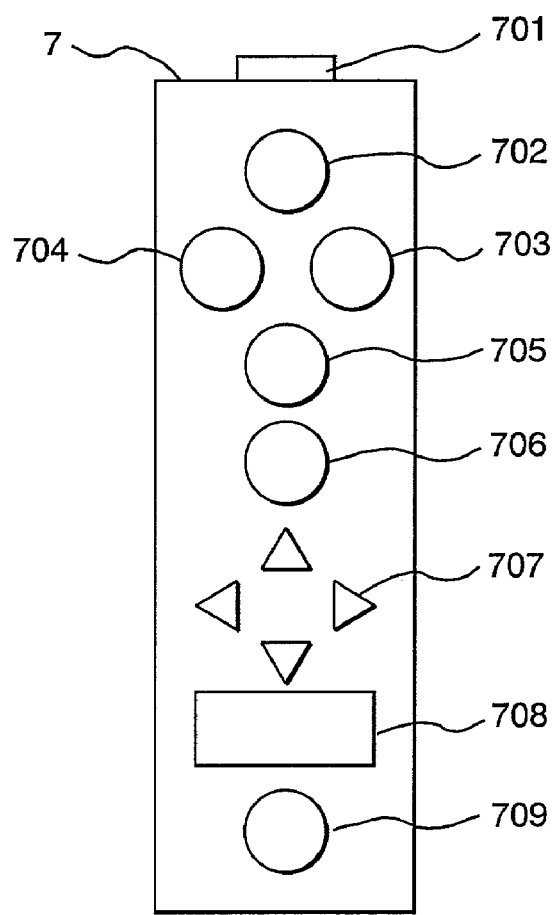
FIG. 6 is a view for showing a brief diagram of an indicator means relating to the self-running vacuum cleaner shown in FIG. 1.

FIG. 1 is a vertical cross-sectional view for showing the self-running vacuum cleaner, briefly. FIG. 2 is a view for showing a flow where the operation is adjusted in the self-running vacuum cleaner shown in FIG. 1. FIG. 3 is a view for showing the operation of the self-running vacuum cleaner shown in FIG. 1. FIG. 4 is a view for showing an instruction of position relating to the self-running vacuum cleaner shown in FIG. 1. FIG. 5 is a view for showing a method for measuring the position of the self-running vacuum cleaner shown in FIG. 1. And, FIG. 6 is a view for showing an indicator means relating to the self-running vacuum cleaner shown in FIG. 1, briefly.

The self-running vacuum cleaner 1 comprises, a cleaning means 2 for make cleaning, a moving means 3 equipped with wheels, a driving means 4 having a motor for driving the moving means 3, an obstruction detection means 5 for detecting an obstruction, and a controller means 6 for adjusting the operations and functions of the self-running vacuum cleaner 1. A user of the self-running vacuum cleaner 1 brings with a position indicator means 7 for instructing a position to where the self-running vacuum cleaner 1 should moves. On the self-running vacuum cleaner 1, a measuring means 8 is mounted, which measures the position or the direction indicated or instructed from the position indicator means 7.

The measuring means 8 provides either the position or the direction measured, as an output to a control signal generator means 9. The control signal generator means 9 generates control signals for moving the self-running vacuum cleaner 1 to the controller means 6. The controller means 6 adjusts the operations of the driving means 4, as well as, a movement assist means 31 for assisting in movement of the self-running vacuum cleaner 1 and the cleaner means 2. With this, the self-running vacuum cleaner 1 performs the operations at desire of the user. Further, the self-running vacuum cleaner 1 uses a battery not shown in the figure. It is preferable to build in a charger for the battery.

A sensor 5 is attached on a front portion of the self-running vacuum cleaner in the running direction thereof. This sensor detects an obstruction lying in the running or moving direction of the self-running vacuum cleaner 1. The sensor 5 detects the obstruction before it hits on the obstruction, and outputs to the controller means 6 a signal indicating that the obstruction is detected. An infrared sensor of reflection type is used For this sensor, for example.

The position indicator means 7 builds in button switches, which will be mentioned in detail later, a light emitting means or a transmitting means. The button switches are used for the user to change over plural numbers of operation modes which the self-running vacuum cleaner has: i.e., including, a homing operation mode, an instruction operation mode, and execution operation mode, etc.

According to the mode selected through the button switch that is pushed by the user, the position indicator means 7 emits a light from a light emitting means or transmits a position signal from the transmitting means. When the homing operation mode is selected, the position indicator means 7 always keeps the signal outputting, or periodically. When the instruction operation mode is selected, the position indicator means 7 outputs the signal every time when the user pushes down the switch. When the execution operation mode is selected, the position indicator means 7 outputs the signal only one (1) time.

The wavelengths of lights emitted or the oscillation frequencies by the position indicator means 7 are preset or determined at values, being different for each of the operation modes. Accordingly, from the light emission wavelength or the oscillation frequency by the position indicator means, it is possible to determine the operation mode under which the self-running vacuum cleaner 1 is selected. Since the self-running vacuum cleaner 1 can determine the selection in the operation mode instructed, the user can input information relating to the position and the direction to where the self-running vacuum cleaner should move, by using the position indicator means 7. According to the present embodiment, an instruction or indication on the region or area to be cleaned up by the self-running vacuum cleaner 1 can be made, by moving the self-running vacuum cleaner 1 directly, or by indicating the cleaning position in the form of a pointer from the light emitting means without directly moving the self-running vacuum cleaner 1.

The position indicator means 7 has a stretching mechanism not shown in the figure, for obtaining the variable distance between the position where the user holds and the position where the light emits or transmits. When the stretching mechanism is contracted, the position indicator means 7 can be portable, while suitable for indicating the position to the self-running vacuum cleaner when being stretched out.

The measuring means, being provided on an upper portion of the self-running vacuum cleaner 1, comprises plural numbers of light-receiving means or signal-receiving means. When the user inputs the information of the selected operation mode by using the position indicator means 7, the mode decision is made in the receiving means through filtering the information by the emission light wavelength or the frequency, depending upon the operation mode inputted. Further, the measuring means 8 measures the position and the direction from where the light-emitting means emits the light or the transmitting means transmits the signal, which are provided in the position indicator means 7, and outputs the measured position and direction of the position indicator means 7, as well as, the information of the operation mode, to the control signal generation means 9. Also, the measuring means 8 measures the position and the direction, which are indicated or instructed via light emission from the light-emitting means or signal transmission from the transmitting means, which are provided in the position indicator means 7, and outputs the measured information to the control signal generator means 9.

In this measuring means 8, the direction of the signal, being emitted or transmitted from the position indicator means 7, is obtained by using the triangulation, the details of which will be mentioned later. The distance from the position indicator means 7 to the measuring means 8, or from the position indicator under the teaching operation mode to the measuring means 8 is obtained from the intensity of the emitted light or transmitted signal. In this instance, the relationship between the intensity of the emitted light or the transmitted signal and the distance is memorized in advance, in the form of a table data within a memory means owned by the measuring means 8, as corrected or calibrated data for each of the sensors owned by the measuring means 8.

Further, with provision of plural numbers of the sensors on a periphery of the measuring means 8, they can be used for obtaining the distance from the position indicator means 7 to the measuring means 8 or the distance from the position indicated by the position indicator means 7 under the instruction operation mode to the measuring means 8, because the time-duration that the signal transmitted from the position indicator means 7 reaches to the sensors differs for each of them. Application of this method into detections of the vertical position and the direction enables the detection of the distance up to the position indicator means 7, or the distance up to the position indicated by the position indicator means under the instruction operation mode, in three (3) dimensions.

According to the present embodiment, a detector means (not shown in the figure) is provided on the main body of the vacuum cleaner 1, for detecting the inclinations in the front-and-rear direction and also in the bilateral direction thereof. Detection of the inclinations in the front-and-rear direction and the bilateral direction of the main body of the vacuum cleaner 1 enables the vacuum cleaner 1 to obtain the position and the direction of the position indicator means 7, as well as, the position and the direction indicated by the position indicator means 7, more accurately.

The control signal generator means 9 generates a control signal for moving the self-running vacuum cleaner 1 upon the basis of the information of the operation mode and the information about the measured position and the direction of the position indicator means 7. This control signal is inputted into the controller means 6. Under the homing operation mode, the control signal generator means 9 generates the control signal for moving the self-running vacuum cleaner 1 to the position and into the direction, which are indicated by the position indicator means 7, always, thereby outputting it to the controller means 6.

The control signal generator means 9 has a temporary memory means 91; therefore it memorizes the indicated position measured under the instruction operation mode by the measuring means 8 therein, contemporarily. Upon receipt of a signal indicative of receiving all the inputs of the indicated positions, the control signal generator means 9 obtains an area including the indicated positions therein, by using the data of all the indicated position memorized in the contemporary memory means 91, thereby setting up or determining the area to be cleaned up. This area determined may be transmitted to the contemporary memory means 91 or the controller means 6.

When the area to be cleaned up is determined, the control signal is produced for moving the self-running vacuum cleaner 1 within that area in accordance with a pattern determined in advance. This signal is memorized into the contemporary memory means 91. The user selects the execution operation mode. When this execution operation mode is selected, the control signal, being produced and memorized under the instruction operation mode, is outputted to the controller means 6. The self-running vacuum cleaner 1 cleans according to the predetermined pattern.

The cleaning pattern(s) is/are memorized in the self-running vacuum cleaner 1 in advance. According to the present embodiment, the cleaning pattern is determined by the user, who selects one from the plural numbers of the patterns displayed on the position indicator means 7, so that she/he considers the most suitable one. Thus, a pattern-setting means is provided in the position indicator means 7. However, this pattern-setting means may be provided in the main body of the self-running vacuum cleaner 1, alternately.

The controller means 6 controls the driver means 4 upon the basis of the obstruction detection signal inputted from the detector means 5 and the control signal inputted from the control signal generator means 9, so that the self-running vacuum cleaner 1 can avoids from hitting on the obstructions. At the same time, the controller means 6 executes the control on the cleaning means 6. A movement assist means 31 is casters, being provided for assisting the self-running vacuum cleaner 1 in movement thereof, i.e., following up the moving means 3 which is driven by the driver means 4.

The operations of the self-running vacuum cleaner, being constructed in such the manner as was mentioned above, will be explained by referring to a processing flowchart shown in FIG. 2.

The user turns on a power switch of the self-running vacuum cleaner (in step 100). Thereafter, she/he sets up the operation under the homing mode, by using the button switches of the position indicator means 7. Then, the self-running vacuum cleaner 1 moves from a position of storage thereof to the position where the cleaning should be made (in step 101).

Under the homing operation mode, the detector means 5 detects the obstruction if any in the direction of advancing of the self-running vacuum cleaner 1, and outputs the obstruction detection signal to the controller means 6. The measuring means 8 measures the position and the direction from where the light emitting means or the transmitting means of the position indicator means 7 emits the light or transmits the signal, or the position and the direction which the position indicator 7 indicates or instructs. These measured data are outputted to the control signal generator means 9. The control signal generator means 9 produces the control signal for moving the self-running vacuum cleaner 1 upon the basis of the data inputted, and then outputs them to the controller means 6.

The controller means 6 controls the driving means 4 upon the basis of the obstruction detection signal inputted from the detector means 5 and the control signal inputted from the control signal generator means 9, so that the self-running vacuum cleaner can avoid from hitting on the obstructions. In this instance, the controller 6 controls the driving means 4, so that the self-running vacuum cleaner 1 follows the position indicator means 7 with keeping a predetermined distance away from. When it arrives at the position indicated, the self-running vacuum cleaner 1 waits at that position until a new position is indicated or instructed from the position indicator means 7 (step 102).

The operation of the self-running vacuum cleaner 1 will be explained by referring to FIG. 3. When the user moves in the left-hand direction while carrying the position indicator means 7 with her/him, in the direction indicated by an arrow on the paper surface of the FIG. 3, the self-running vacuum cleaner 1 also moves in the direction of the same arrow, so that the light receiving means 8b at the front surface reacts most strongly, among the plural numbers of the light-receiving means 8a attached on a surface of the measurement means 8, which is provided on the upper portion of the self-running vacuum cleaner 1. However, it may be possible to move the self-running vacuum cleaner 1, so that it keeps the distance at the shortest, i.e., from the position indicator means 7 to the receiving means 8b, which is positioned at the most front surface among the plural numbers of the receiving means attached on the surface of the measuring means 8. In this instance, it is preferable to make the distance in the vertical direction short.

When the self-running vacuum cleaner 1 comes up to the cleaning area, the user sets it into the instruction operation mode by using the button switches of the position indicator means 7. The self-running vacuum cleaner 1 stops at that place, and is under the condition of waiting an instruction from the position indicator means 7 (step 103).

When the instruction operation mode is selected, the position indicator means 7 determines whether the pattern-setting mode is selected or not. If the pattern-setting mode is selected by pushing down the button thereof, all the preset patterns are displayed for the user, which are memorized in the position indicator means 7 in advance. The user selects one from the plural numbers of the patterns memorized, and then the selected pattern is transmitted to the measuring means 8. Upon receipt of the signal from the measuring means 8, the controller means 6 determines the operation pattern of the self-running vacuum cleaner 1, so that it makes the vacuum cleaner clean up in accordance with the pattern selected.

If not operating under the pattern-setting mode, the position indicator means 7 determines that the operation is under the position-indicating mode. The measuring means 8 measures the position and the direction indicated by the signal of light emission or of transmission of signal generated from the position indicator means 7, every time when the button switch of the position indicator means 7 is pushed down, so as to provide an output to the control signal generator means 9. The control signal generator means 9 memorizes the information of the position and the direction from where it is generated, every time when the switch button of the position indicator means 7 is pushed down, into the temporary memory means 91. When the signal indicative of completion of inputting of all the indicated positions to the control signal generator means 9, then the areas, including all the indicated areas memorized in the temporary memory means 91 until that time, are determined to be the cleaning area. Next, the control signal generator means 9 produces the control signal for moving the self-running vacuum cleaner 1 within the area, to be memorized into the temporary memory means 91, temporarily.

An example will be explained about the instruction or indication operation to the self-running vacuum cleaner 1 under the position indication mode, by referring to FIG. 4. This shows the case where the user indicates or instructs the positions of instruction points P1, P2, P3, P4 and P5, by using the position indicator means 7. The positions are memorized in the order of the points P1, P2, P3, P4 and P5. When the user does not indicate the order of those instruction points in particular, the cleaning area is defined as the area enclosed by broken lines, drawn by connecting between the instruction points in the order of inputting thereof.

An example of the method, how the self-running vacuum cleaner 1 learns the indicated positions, by referring to FIG. 5.

For the position P indicated with using the indicator means 7 by the user, two (2) sets of sensors are selected from plural numbers of the receiving sensors provided in the measuring means 4. In a case where the indicator means 7 has the light-emitting means, the light-receiving sensors are selected on both sides, neighboring with the light-receiving sensor generating the largest detection output therefrom among plural numbers of the light receiving sensors, which are attached on the surface of the measuring means 8. The distance L between those sensors is obtained in advance.

The distance between each of the light-receiving sensors 8a and the position indicator means 7 can be obtained from the strength or intensity of the detection signals detected by the two (2) sensors selected. From the distances between each of the light-receiving sensors 8a and the position indicator means 7, and also the distance L between the light receiving sensors 8a and 8b, angles $\theta 1$ and $\theta 2$ can be obtained, being defined by the indicated position P to the line connecting between the light-receiving sensors 8a. With using these, the direction and the distance of the indicated position P can be obtained from the principle of triangulation. In this manner, the position is instructed to the self-running vacuum cleaner 1.

Further, application of CCD (charge coupled device) for the light-receiving means makes it possible to obtain the elevation angles $\theta 1$ and $\theta 2$ of the indicated position P in each of the light-receiving sensors 8a and 8b, from the pixel numbers of the CCD. The indicated position P can be obtained from L, $\theta 1$ and $\theta 2$, through the method of triangulation. Also, in the place of the light-receiving means, the receiving means may be provided for obtaining the distance up to the indicated position, upon the basis of the time-duration until arrival of the signal from the indicated position to this receiving means.

When the user inputs the completion of instruction of the positions to the position indicator means 7, after selecting the cleaning pattern in the area and indicating three (3) or more positions, the self-running vacuum cleaner 1 decides an area to be the cleaning area instructed, being defined in the polygonal shape at the points indicated as the apexes thereof. Then, the controller means 6 instructs the driving means thereof to move the self-running vacuum cleaner to this area, and then it drives the cleaning means 2 to make cleaning. However, in the place of the area determined by plural numbers of the instruction points, the cleaning area may be formed in a polygonal shape, but being determined upon basis of the plural numbers of the instruction points and the position where the self-running vacuum cleaner stands when the instruction is made. For example, the self-running vacuum cleaner 1 may be so constructed that it determines the area based on the polygon, to be the cleaning area instructed, which can be formed by the present position and other two (2) positions after the user designates those two.

If the position is indicated by only one point when the pattern of cleaning is selected for the cleaning area, the self-running vacuum cleaner 1 determines this indicated point to be the instructed position to where it should move. Then, the controller means 6 controls the self-running vacuum cleaner 1 to make cleaning while moving it from the present position to this indicated position. However, the controller means 6 may make control, so that the self-running vacuum cleaner 1 moves to the instructed area without making cleaning on the way, and thereafter cleaning up the area, which is determined in advance. Also, under the operation instruction mode, it is needless to say the position may be instructed after moving the self-running vacuum cleaner to the indicated position.

When the user pushes down the button switch of the position indicator means 7, thereby setting the vacuum cleaner in the execution operation mode, the position indicator 7 outputs a signal for executing the cleaning (step 105).

When the position indicator means 7 outputs the signal for executing the cleaning, the detector means detects the obstruction if any in the moving direction of the self-running vacuum cleaner 1, thereby outputs the obstruction detection signal to the controller means 6. The controller means 6 controls the driving means 4, so that the self-running vacuum cleaner 1 avoids from hitting on the obstructions, upon the basis of this obstruction detection signal and the control signal for moving the cleaner in accordance with the predetermined pattern within the cleaning area. At the same time, the controller means 6 drives the vacuum cleaner to run in accordance with the predetermined pattern, while cleaning by the cleaning means 2 (step 106).

When cleaning, the vacuum cleaner may be made to clean while moving around the positions P1→P2→P3→P4→P5 in that order, for example, and thereafter cleaning the area inside the polygon which is defined by those instructed positions. Alternatively, on the contrary to this, the vacuum cleaner may be made so that it does not move to the polygonal area defined by those instructed positions, or it does not make cleaning therein.

When the self-running vacuum cleaner 1 completes the cleaning thereof, the controller 6 makes stop of the cleaning means 2. The self-running vacuum cleaner 1 is in the condition of waiting for the input from the position indicator means 7. The processes from the step 101 to the step 106 will be repeated again until the time when being inputted with the instruction for completion by the user, (step 107).

According to the present embodiment, the user can move the self-running vacuum cleaner from the storage place to the cleaning place, easily, by using the position indicator means. Also, in the cleaning place, since the user can indicates or instructs the cleaning area by using the same position indicator means, the instruction on the cleaning area to the self-running vacuum cleaner can be made simply and accurately.

Further, instruction on the cleaning area directly, by using the position indicator means, does not necessitate a special training for operation of the self-running vacuum cleaner, such as, training in driving thereof, etc., and therefore the user can operate the self-running vacuum cleaner easily.

Further, though explained above that the vacuum cleaner conducts only the homing operation when it moves from the storage place to the cleansing place, the cleaner may make cleaning during the homing operation. Also, the switch of the vacuum cleaner may be provided on the side of position indicator means.

More details will be shown, by referring to FIG. 6, on the position indicator means 7, which may be used in the embodiment shown in FIG. 1. In FIG. 6, the position indicator means 7 is held by hand of the user, or is attachable onto a body or clothes of the user.

The position indicator means 7 has the structure same to a remote controller for household equipment. On a portion coming to an upper end surface when this position indicator 7 is held by hand, a transmitter portion 701 is provided for transmitting a signal for indicating or instructing the position or the direction to the self-running vacuum cleaner 1. On a front surface of the position indicator means 7 there are provided a homing button 702, a position instruction button 703, a pattern setting button 704, an instruction end button 705 and an execution button 706, corresponding to the operation modes, respectively.

For the time when the self-running vacuum cleaner 1 makes cleaning or when being instructed or indicated with the positions by using the position indicator means 7, an operation button 707 of four (4)-direction indicator type is provided near to the center of the position indicator means 7, for the purpose of manipulating the moving direction of the self-running vacuum cleaner 1. Further, a display portion 708 for displaying information to the user and a start/stop button 709 for turning the operation of the self-running vacuum cleaner 1 into ON/OFF are provided on the lower potion thereof. Pushing down of those button switches 702–706 generates signals, such as the selection, the end and the execution of operation of the operation modes. For example, to select the homing mode or to start the mode, the user pushes down the homing button 702. The pattern-setting button 704 is pushed down when the user determines the pattern selected.

The position instruction button 703 is pushed down when selecting the position instruction mode, or when instructing the area to be cleaned up or indicating the order of the movements. In the indication of the cleaning area and/or the order of movements, the position instruction button 703 is pushed down by plural numbers of times. When finishing the position instruction mode, the instruction end button 705 is pushed down. The execution button 706 is pushed down when executing the operation that has been determined and instructed. Though the instruction end button 705 to be pushed down when finishing the position instruction mode is provided in the present embodiment, this button may be omitted. Also, the operation button 707 may be used when selecting the pattern, or when changing over the information to be displayed on the display means 708.

Figure 7:
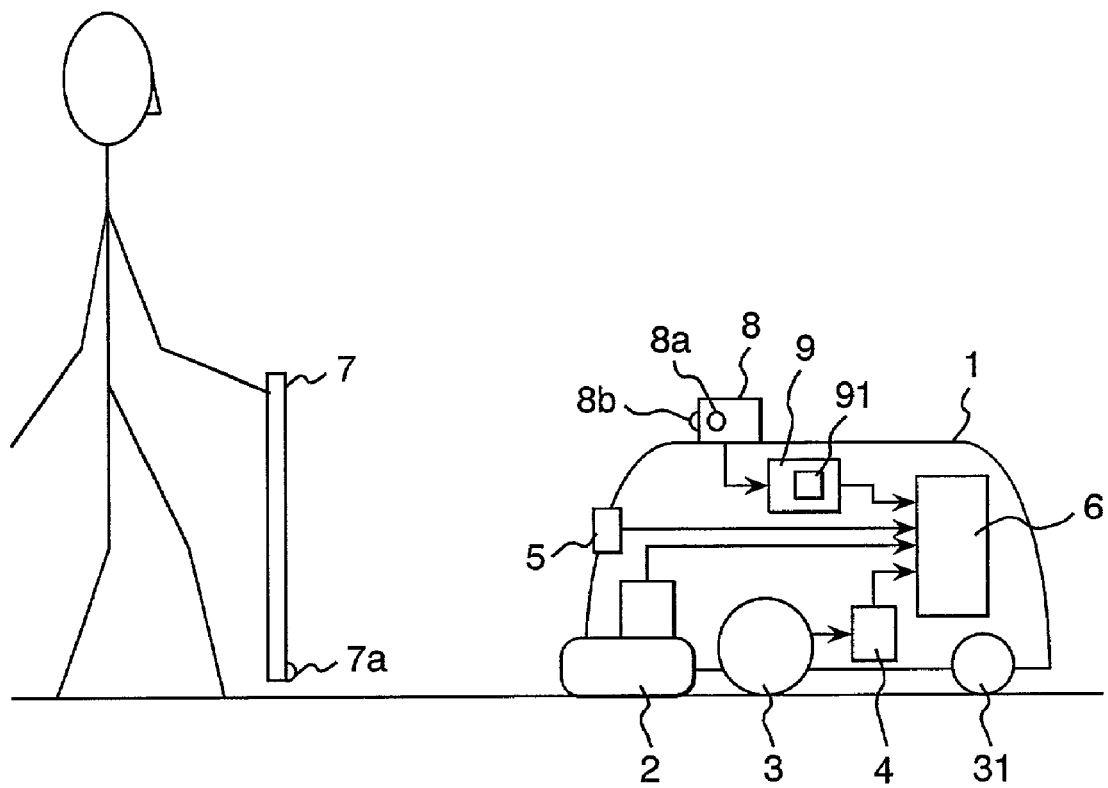
FIG. 7 is a vertical cross-sectional view for showing a variation of the self-running vacuum cleaner, in brief.

A variation of the embodiment mentioned above will be explained by referring to FIG. 7. FIG. 7 is a block diagram for showing an outline of the self-running vacuum cleaner. The constituent elements or parts attached with the same numerical numbers indicate the same or similar ones of the embodiment shown in FIG. 1. The present embodiment differs from that shown in FIG. 1 in that the position indicator means 7 is elongated in the length thereof. The user holds the position indicator means 7 on a portion thereof near to an end, at around her/his waist, and lowers the position of the light-emitting means or the signal transmitting means 7a, which is provided in vicinity of the other end of the position indicator means 7, down close to the floor surface. With doing this, the user is able to instruct or indicate the floor surface to be cleaned up by the self-running vacuum cleaner 1 easily and accurately.

According to the present embodiment, since the user is able to make the self-running vacuum cleaner moving the shortest course, without bumping or hitting on the walls, etc., even in a corner, the user can guide the self-running vacuum cleaner easily or simply.

Although the infrared sensor of reflection-type is applied as the detector means for detecting the obstructions in the present embodiment, however it may be made up by an ultrasonic sensor, or may other ones, such as, a bumper switch for detecting the obstruction hitting. According to the present embodiment, the light-receiving means or the receiver means are provided in plural numbers thereof for the measuring means, however they may be made up by an image pickup means for picking up an image in two (2)-dimensions, or a means for receiving the ultrasonic waves.

According to the various embodiments mentioned above, with using the position indicator means, the user is able to make controlling on both: of moving the vacuum cleaner following or tacking the moving course thereof; and of making the self-running vacuum cleanser clean up the area, therefore the user can allow the vacuum cleaner move by itself. Also, there is no necessity for the user to carry the vacuum cleaner, therefore the load imposed upon the user can be reduced.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications falling within the ambit of the appended claims.

What is claimed is:

1. A self-running vacuum cleaner, being able to move by itself, comprising:
   an instruction means, operable separately from a main body of the self-running vacuum cleaner and portable by a hand of a user, for generating an instruction signal therefrom at least one spatial position selected by the user;
   a cleaning portion for cleaning up a floor surface;
   a moving means for moving the cleaning portion;
   a driving means for driving the moving means; and
   a position detecting means using at least two receivers, to receive input of any of the instruction signals generated by the instruction means at each said at least one spatial position, and use each subject instruction signal to calculate a spatial position corresponding thereto where the subject instruction signal was generated, irrespective of movement of the vacuum cleaner, wherein the vacuum cleaner moves to at least one spatial position where the instruction signal was generated as calculated by the position detecting means.

2. A self-running vacuum cleaner, as described in claim 1, wherein the instruction means comprises a light emitting means, and the instruction signal is a light signal.

3. A self-running vacuum cleaner, as described in claim 1, wherein the position detecting means detects at least two spatial positions corresponding to at least two instruction signals, respectively, and wherein the vacuum cleaner moves to the at least two spatial positions.

4. A self-running vacuum cleaner, as described in claim 1, wherein the self-running vacuum cleaner is selectable into any one of a plurality of modes, including: a mode of following the instruction signal generated from the instruction means; a mode of instructing plural instruction signals corresponding to plural spatial positions from the instruction means; and a mode of moving to any one of the plural spatial positions to effect cleaning.

5. A self-running vacuum cleaner, as described in claim 1, wherein the position detecting means calculates a spatial position of the instruction signal using receiving directions of the instruction signal.

6. A self-running vacuum cleaner, as described in claim 1, wherein any data in the instruction signal contains no spatial position data.

7. A self-running vacuum cleaner, being able to move by itself, comprising:
   an instruction means, operable separately from a main body of the self-running vacuum cleaner and portable by a hand of a user, for generating an instruction signal therefrom at each of a plurality of spatial positions selected by the user;
   a cleaning portion for cleaning up a floor surface;
   a moving means for moving the cleaning portion;
   a driving means for driving the moving means;
   a position detecting means using at least two receivers, to receive input of ones of the instruction signals generated by the instruction means at each said plurality of spatial positions and use each subject instruction signal to calculate a spatial position corresponding thereto where each subject instruction signal was generated, irrespective of movement of the vacuum cleaner; and
   an area defining means for defining a cleaning area on the floor surface based on plural spatial positions where ones of the instruction signal were generated as calculated by the position detecting means.

8. A self-running vacuum cleaner, as described in claim 7, wherein the instruction means comprises a light emitting means, and the instruction signal is a light signal.

9. A self-running vacuum cleaner, as described in claim 7, wherein the position detecting means detects at least three spatial positions corresponding to at least three instruction signals, respectively, and wherein the vacuum cleaner moves to the at least three spatial positions.

10. A self-running vacuum cleaner, as described in claim 7, wherein a moving pattern for moving the vacuum cleaner within the cleaning area is memorized in advance, and the vacuum cleaner is driven in accordance with the moving pattern.

11. A self-running vacuum cleaner, as described in claim 7, wherein a plurality of moving patterns for moving the vacuum cleaner within the cleaning area are memorized in advance, and are selectable such that the vacuum cleaner is driven in accordance with a selected moving pattern.

12. A self-running vacuum cleaner, as described in claim 7,
   wherein the self-running vacuum cleaner is selectable into any one of a plurality of modes, including: a mode of following the instruction signal generated from the instruction means; a mode of instructing plural instruction signals corresponding to plural spatial positions from the instruction means; and a mode of moving to any one of the plural spatial positions to effect cleaning.

13. A self-running vacuum cleaner, being able to move by itself, comprising:
   an instruction remote, operable separately from a main body of the self-running vacuum cleaner and portable by a hand of a user, allowing transmission of an instruction signal therefrom at least one spatial position selected by the user;
   a cleaning portion for cleaning up a floor surface;
   moving mechanisms to effect movement of the cleaning portion;
   a driving unit to drive the moving mechanisms; and
   a position detecting unit using at least two receivers to receive input of any of the instruction signals generated by the instruction remote at each of at least one spatial position and to use each subject instruction signal to calculate a spatial position corresponding thereto where the instruction signal was generated, irrespective of the movement of the vacuum cleaner, wherein the vacuum cleaner moves to at least one spatial position where the instruction signal was generated as calculated by the position detecting unit.

14. A self-running vacuum cleaner, as described in claim 13, wherein the instruction remote comprises light emitter hardware, and the instruction signal is a light signal.

15. A self-running vacuum cleaner, as described in claim 13, wherein the position detecting unit detects at least two spatial positions corresponding to at least two instruction signals, respectively, and wherein the vacuum cleaner moves to the at least two spatial positions.

16. A self-running vacuum cleaner, as described in claim 13,
wherein the self-running vacuum cleaner is selectable into any one of a plurality of modes, including: a mode of following the instruction signal generated from the instruction remote; a mode of instructing plural instruction signals corresponding to plural spatial positions from the instruction remote; and a mode of moving to any one of the plural spatial positions to effect cleaning.

17. A self-running vacuum cleaner, as described in claim 13, wherein the position detecting unit calculates a spatial position of the instruction signal using multiple receiving directions of the instruction signal.

18. A self-running vacuum cleaner, as described in claim 13, wherein any data in the instruction signal contains no spatial position data.

19. A self-running vacuum cleaner, being able to move by itself, comprising:
an instruction remote, operable separately from a main body of the self-running vacuum cleaner and portable by a hand of a user, for generating an instruction signal therefrom at each of a plurality of spatial positions selected by the user;
a cleaning portion for cleaning up a floor surface;
moving mechanisms to effect movement of the cleaning portion;
a driving unit to drive the moving mechanisms;
a position detecting unit using at least two receivers to receive input of ones of the instruction signals generated by the instruction remote at each said plurality of spatial positions and to use each subject instruction signal to calculate a spatial position corresponding thereto where each subject instruction signal was generated, irrespective of movement of the vacuum cleaner; and
an area defining unit to define a cleaning area on the floor surface based on plural spatial positions where ones of the instruction signal were generated as calculated by the position detecting unit.

20. A self-running vacuum cleaner, as described in claim 19, wherein the instruction remote comprises light emitting hardware, and the instruction signal is a light signal.

21. A self-running vacuum cleaner, as described in claim 19, wherein the position detecting unit detects at least three spatial positions corresponding to at least three instruction signals, respectively, and wherein the vacuum cleaner moves to the at least three spatial positions.

22. A self-running vacuum cleaner, as described in claim 19, wherein a moving pattern for moving the vacuum cleaner within the cleaning area is memorized in advance, and the vacuum cleaner is driven in accordance with the moving pattern.

23. A self-running vacuum cleaner, as described in claim 19, wherein a plurality of moving patterns for moving the vacuum cleaner within the cleaning area are memorized in advance, and are selectable such that the vacuum cleaner is driven in accordance with a selected moving pattern.

24. A self-running vacuum cleaner, as described in claim 19,
wherein the self-running vacuum cleaner is selectable into any one of a plurality of modes, including: a mode of following the instruction signal generated from the instruction remote; a mode of instructing plural instruction signals corresponding to plural spatial positions from the instruction remote; and a mode of moving to any one of the plural spatial positions to effect cleaning.

25. A self-running vacuum cleaner, being able to move by itself, comprising:
an instruction remote transmitter to transmit a radiation instruction beacon therefrom at least one spatial position separated from a main body of the self-running vacuum cleaner as selected by the user;
a cleaning portion for cleaning up a floor surface;
a moving means for moving the cleaning portion;
a driving means for driving the moving means; and
a position detecting means using at least two radiation receivers, to receive input of any of the radiation instruction beacons transmitted by the instruction remote transmitter at each said at least one spatial position, and use each subject radiation instruction beacon to calculate a spatial position corresponding to where the subject radiation instruction beacon was generated, irrespective of movement of the vacuum cleaner, wherein the vacuum cleaner moves to at least one spatial position where the radiation instruction beacon was generated as calculated by the position detecting means.

* * * * *